US008737306B2

(12) United States Patent
Cui

(10) Patent No.: US 8,737,306 B2
(45) Date of Patent: May 27, 2014

(54) METHOD FOR TRIGGERING STATUS REPORTS AND APPARATUS THEREOF

(75) Inventor: Jinlong Cui, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 84 days.

(21) Appl. No.: 13/496,631

(22) PCT Filed: Apr. 23, 2010

(86) PCT No.: PCT/CN2010/072111
§ 371 (c)(1),
(2), (4) Date: Mar. 16, 2012

(87) PCT Pub. No.: WO2011/032384
PCT Pub. Date: Mar. 24, 2011

(65) Prior Publication Data
US 2012/0176910 A1    Jul. 12, 2012

(30) Foreign Application Priority Data

Sep. 21, 2009    (CN) .......................... 2009 1 0176827

(51) Int. Cl.
*H04W 4/00*    (2009.01)
(52) U.S. Cl.
USPC ....................................................... 370/328
(58) Field of Classification Search
None
See application file for complete search history.

(56) References Cited

U.S. PATENT DOCUMENTS

| | | | | |
|---|---|---|---|---|
| 2004/0208160 A1* | 10/2004 | Petrovic et al. | ............... | 370/350 |
| 2006/0013257 A1* | 1/2006 | Vayanos | ....................... | 370/473 |
| 2007/0115912 A1* | 5/2007 | Wu | ............................. | 370/346 |
| 2007/0291695 A1* | 12/2007 | Sammour et al. | ............. | 370/331 |
| 2009/0149189 A1* | 6/2009 | Sammour et al. | ............. | 455/450 |
| 2009/0181703 A1 | 7/2009 | Jiang | | |
| 2010/0105334 A1* | 4/2010 | Terry et al. | .................. | 455/67.11 |
| 2010/0208651 A1* | 8/2010 | Ramos Peres et al. | ........ | 370/328 |
| 2010/0322155 A1* | 12/2010 | Meyer et al. | .................. | 370/328 |
| 2011/0013567 A1* | 1/2011 | Torsner et al. | ................ | 370/328 |
| 2011/0211457 A1* | 9/2011 | Larmo et al. | .................. | 370/241 |

FOREIGN PATENT DOCUMENTS

| | | |
|---|---|---|
| CN | 1972284 A | 5/2007 |
| CN | 101132257 A | 2/2008 |
| CN | 101483506 A | 7/2009 |
| WO | 2006066606 A1 | 6/2006 |

OTHER PUBLICATIONS

ETSI TS 136 322 V8.2.0 (Nov. 2008):LTE; Evolved Universal Terrestrial Radio Access(E-UTRA); Radio Link Control (RLC) protocol specification (3GPP TS 36.322 version 8.2.0 Release 8).
International Search Report for PCT/CN2010/072111 dated Jul. 2, 2010.

* cited by examiner

*Primary Examiner* — Anh-Vu Ly
*Assistant Examiner* — Gustavo Lopez-Vargas
(74) *Attorney, Agent, or Firm* — Ling Wu; Stephen Yang; Ling and Yang Intellectual Property

(57) ABSTRACT

The present invention discloses a method and an apparatus for triggering a status report in a RLC acknowledged mode protocol. The technical scheme includes: A, constructing and transmitting a status report at a data receiving end of a RLC layer when a reordering timer is timeout or a packet for setting a polling bit is received from a transmitting end; B, determining whether the data receiving window is in smoothly moving status, and if in the smoothly moving status, enabling a status prohibit timer immediately after the status report has been transmitted, and considering the retransmission triggered by the status report at this time to be successful; and if the data receiving window is not in the smoothly moving status, performing step C; C, detecting whether the retransmission triggered by the status report at this time is successful, and if successful, enabling the status prohibit timer.

8 Claims, 4 Drawing Sheets

METHOD FOR TRIGGERING STATUS REPORTS AND APPARATUS THEREOF

TECHNICAL FIELD

The present invention relates to the field of mobile communication technology, and in particular, to a method and an apparatus for triggering a status report in a Radio Link Control (RLC) layer acknowledged mode protocol in a Long Term Evolution (LTE) system.

BACKGROUND OF THE RELATED ART

A RLC protocol layer is a sub-layer of Layer 2 (L2) in a radio interface protocol stack of the LTE, and is located between a Media Access Control (MAC) layer and a Packet Data Convergence Protocol (PDCP) layer. Functions of the RLC protocol layer include link control, packaging and reassembly, concatenation, user data transmission, error correction, protocol error detection and repair etc., which provides segmentation and retransmission services for users and control data.

Each RLC protocol entity is configured by a Radio Resource Control (RRC) layer and operates in three data transmission modes, which are a Transparent Mode (TM), an Unacknowledged Mode (UM) and an Acknowledged Mode (AM) respectively. In the Automatic Repeat Request (ARQ) in the AM, the reliability of data transmission is ensured by a receiving end transmits a status report to a transmitting end, and the transmitting end determining which Protocol Data Units (PDUs) have been acknowledged to be received by the receiving end and which PDUs or PDU segments require retransmitting according to a packet number (ACK_SN) where the status report cuts off (ACK_SN) in the status report and packet numbers (NACK_SN) of packets which are not received before the ACK_SN. FIG. 1 is a schematic diagram of architecture of a RLC in an AM protocol.

In the 36.322 protocol, at present, the process for triggering a status report in the AM involves two timers, both of which are used in a RLC data transmission receiving end. The first one is a reordering timer (t-Reordering), which is used to detect a loss condition of bottom layer data, and a status report is transmitted to a transmitting end when the t-Reordering is timeout. The second one is a status prohibiting timer (t-StatusProhibit), which is used to limit a frequency at which the status report is transmitted, i.e., the time for twice transmitting the status report should satisfy a certain time interval. There are two modes for triggering the status report: 1) the RLC transmitting end performing the triggering in a polling mode; and 2) the RLC receiving end detecting that the reception of the PDU fails (the t-Reordering is timeout). The second mode related to the present invention will be described primarily here. First, if the RLC receiving end detects that the packets do not arrive in order, the RLC receiving end will enable the t-Reordering immediately, and when the t-Reordering is timeout, update of the VR(MS) and transmission of the status report will be triggered, wherein the VR(MS) is used to identify and a cut-off location of the constructed status report in a data receiving window, i.e., a value of the above ACK_SN, and the transmission of the status report must be triggered after the update of the VR(MS). Second, the triggering of the status report is not unlimited at all, but is required to satisfy a certain transmission interval. If the t-StatusProhibit does not operate, and when the first transmission occasion indicated by a lower layer arrives, a status report will be constructed and delivered to the lower layer; otherwise, when the first transmission occasion indicated by the lower layer arrives after the t-StatusProhibit is timeout, a status report will be constructed and delivered to the lower layer. When one status report has been delivered to the lower layer, a receiving side of the RLC AM entity will enable the t_status_prohibit timer.

It can be seen from the above discussion that the transmission of a packet in the AM should be acknowledged by a status report. As a Hybrid Automatic Repeat Request (HARQ) of the bottom layer has a limitation on the number of times for retransmitting the loss packets, there is no mechanism for ensuring that the status report per se will be received certainly at the RLC layer, and the twice triggering of the status report are required to satisfy a certain time interval. Thus, if the status report is lost at the bottom layer, that is, the packet retransmission of the status report is unsuccessful, the retransmission will be implemented only when the status report is triggered at the next time.

However, in certain conditions of the AM, the acknowledgement of the status report by an upper layer is necessary, which is primarily represented in the condition that the receiving window is about to be filled up. When the receiving window stops, the transmitting window also necessarily has stopped. At this time, if the data receiving end triggers the status reports but the status reports is lost at the lower layer, the transmitting end is requested to retransmit the corresponding PDU segments only when a new round of status reports are triggered.

In the related art, no matter the method for triggering a status report is in which data transmission window status, the status report constructed at each time is only transmitted once, and it cannot ensure that the status report is transmitted to a data transmitting end successfully, so that is cannot ensure that the status report can trigger an effective packet retransmission, which may lead to relieving the stopped status of the window only if it is needed to wait for at least one period of the status prohibit timer or the reordering timer or a polling timer in the condition that the window stops due to being filled up. Therefore, it causes that the transmission of air interface data is delayed and the transmission speed of air interface data is relatively low.

SUMMARY OF THE INVENTION

The technical problem to be solved in the present invention is to provide a method and an apparatus for triggering a status report in a RLC acknowledged mode protocol, which can ensure that the retransmission triggered by the status report is feasible and effective, thereby avoiding a problem that the transmission speed of air interface data is relatively low in the condition that a window stops due to being filled up.

In order to solve the above technical problem, the method for triggering a status report according to the present invention comprises:

in step A, constructing and transmitting a status report at a data receiving end of a Radio Link Control (RLC) layer when a reordering timer is timeout or a packet for setting a polling bit is received from a transmitting end, and then performing step B;

in step B, determining whether a data receiving window is in smoothly moving status, and if in the smoothly moving status, enabling a status prohibit timer immediately after the status report has been transmitted; and if the data receiving window is not in the smoothly moving status, performing step C;

in step C, detecting whether retransmission triggered by the status report at this time is successful, and if successful, enabling the status prohibit timer; and if not successful, performing step D; and in step D, triggering the status report again, and returning to step B.

Furthermore, in step B, determining whether the data receiving window is in the smoothly moving status specifically comprises:

if a distance between a back edge and a front edge of the data receiving window is within an interval of [0, Window_Size−N), determining that the data receiving window is in the smoothly moving status; and if the distance between the back edge and the front edge of the data receiving window is within an interval of [Window_Size−N, Window_Size], determining that the data receiving window is not in the smoothly moving status;

wherein N is an integer which is larger than 0 and less than Window_Size/2; and Window_Size refers to a size of the data receiving window.

Furthermore, in step B, when enabling the status prohibit timer, the method further comprises: setting a time length of the status prohibit timer to T_status_prohibit−n*10*Wait_Retx_Threshold, wherein Tstatus_prohibit is the time length of the status prohibit timer; and n represents times for previously repeated triggering of the status report, and n=0 during a first triggering.

Furthermore, in step C, detecting whether the retransmission triggered by the status report at this time is successful specifically comprises:

step C1, recording a system frame number at time when transmitting the status report at this time; and step C2, when a difference between a system frame number at a current time and the recorded system frame number at the time when transmitting the status report is equal to a number of required system frames from transmitting the status report to completing the retransmission, judging whether a location of the back edge of the data receiving window changes, and if changes, determining that the retransmission triggered by the status report at this time is successful; and if does not change, determining that the retransmission triggered by the status report at this time is unsuccessful.

Furthermore, in step C, if detecting that the transmission triggered by the status report at this time is successful, and when enabling the status prohibit timer, the method further comprises: setting a time length of the status prohibit timer to T_status_prohibit−n*10*Wait_Retx_Threshold;

wherein T_status_prohibit is the time length of the status prohibit timer, and n represents times for repeatedly triggering the status report before the retransmission triggered by the status report is successful, and n=0 during a first triggering.

Furthermore, the method further comprises: ending a current procedure for triggering the status report and switching to processing of a next status report when the reordering timer is timeout or the receiving end receives a next packet for setting a polling bit from the transmitting end.

In order to solve the above technical problem, an apparatus for triggering a status report comprises a processor which comprises: a status report constructing module, a window status detecting module, a retransmission detecting module, and a timer adjusting module; wherein.

the status report constructing module is configured to: construct and transmit a status report when a reordering timer is timeout or a data receiving end of a Radio Link Control (RLC) layer receives a packet for setting a polling bit from a transmitting end; and triggering the status report again when the retransmission detecting module detects that the retransmission triggered by the status report is unsuccessful;

the window status detecting module is configured to: detect whether a data receiving window is in smoothly moving status after the status report constructing module transmits the status report;

the retransmission detecting module is configured to: detect whether retransmission triggered by the status report which is transmitted by the status report constructing module is successful when the window status detecting module detects that the data receiving window is not in the smoothly moving status; and the timer adjusting module is configured to: enable a status prohibit timer when the window status detecting module detects that the data receiving window is in the smoothly moving status; and enable the status prohibit timer when the retransmission detecting module detects that the retransmission triggered by the status report at this time is successful.

Furthermore, the window status detecting module is further configured to: determine that the data receiving window is in the smoothly moving status if a distance between a back edge and a front edge of the data receiving window is within an interval of [0, Window_Size−N); and determine that the data receiving window is not in the smoothly moving status if the distance between the back edge and the front edge of the data receiving window is within an interval of [Window_Size−N, Window_Size] in a condition of detecting whether the data receiving window is in the smoothly moving status;

wherein N is an integer which is larger than 0 and less than Window_Size/2; and Window_Size refers to a size of the data receiving window.

Furthermore, the retransmission detecting module is further configured to: record a system frame number at time when transmitting the status report transmitted by the status report constructing module in a condition of detecting whether the retransmission triggered by the status report which is transmitted by the status report constructing module is successful; and determine whether a location of the back edge of the data receiving window changes when a difference between a system frame number at the current time and the recorded system frame number at the time when transmitting the status report is equal to a number of required system frames from transmitting the status report to completing the retransmission, and determine that the retransmission triggered by the status report at this time is successful if changes; and determine that the retransmission triggered by the status report at this time is unsuccessful if does not change.

Furthermore, the timer adjusting module is further configured to: set a time length of the status prohibit timer to T_status_prohibit−n*10*Wait_Retx_Threshold when enabling the status prohibit timer;

wherein T_status_prohibit is the time length of the status prohibit timer; and n represents times for repeatedly triggering the status report before the retransmission triggered by the status report is successful, and n=0 during a first triggering.

The apparatus for triggering the status report further comprises a triggering cut-off module, which is configured to: transmit orders to other modules in the apparatus to end processing of triggering the current status report and switch to processing of a next status report when the reordering timer is timeout or the receiving end receives a next packet for setting a polling bit from a transmitting end.

With the technical scheme of the present invention, the RLC can enable the lost data to be retransmitted and delivered effectively. In particular, in the condition that the window is about to be filled up, the data receiving end ensures that the transmitting end retransmits the lost data as soon as possible by repeatedly transmitting a status report, so as to reduce or avoid the stop of a window due to the transmitting window of the transmitting end being filled up.

PREFERRED EMBODIMENTS OF THE PRESENT INVENTION

The present invention will be further described in detail in combination with accompanying drawings and specific embodiments hereinafter.

In the related art, no matter the method for triggering a status report is in which data transmission window status, the status report constructed at each time is only transmitted once, and it cannot ensure that the status report is transmitted to a data transmitting end successfully, so that it cannot ensure that the status report can trigger an effective packet retransmission, which may lead to relieving the stopped status of the window only if it is needed to wait for at least one period of the status prohibit timer or the reordering timer or a polling timer in the condition that the window stops due to being filled up. Therefore, it causes that the transmission of air interface data is delayed and the transmission speed of air interface data is relatively low.

The present invention can efficiently ensure that the retransmission triggered by a status report is feasible and effective, so as to efficiently avoid the problem that the transmission speed of air interface data is relatively low in the condition that a window stops due to being filled up for a method for retransmitting a packet in the related art, implement that the transmission of the air interface data can be performed in time in the condition of various data transmission window status, and improve the transmission speed and efficiency of the air interface data.

Figure 1:
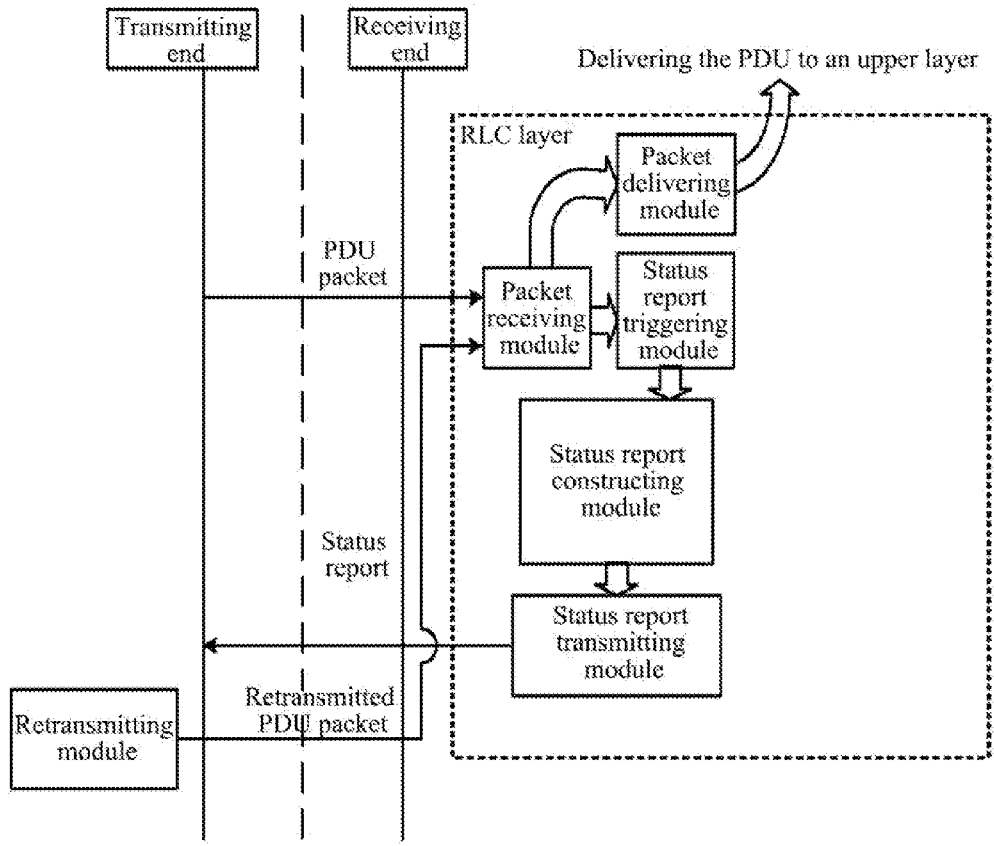
FIG. 1 is a schematic diagram of architecture of a RLC in an AM protocol.
Figure 2:
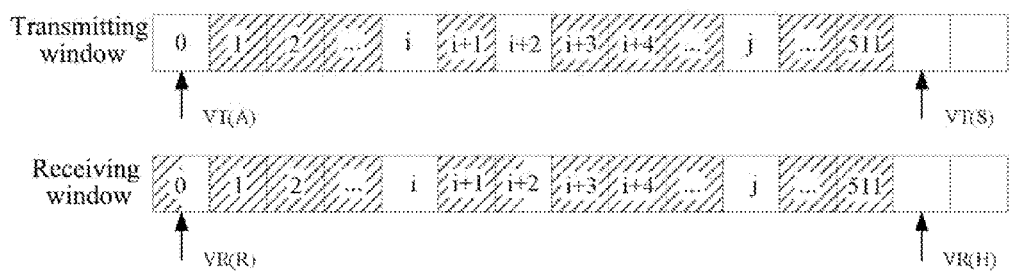
FIG. 2 is a schematic diagram of stopped status of a window due to being filled up.
Figure 3:
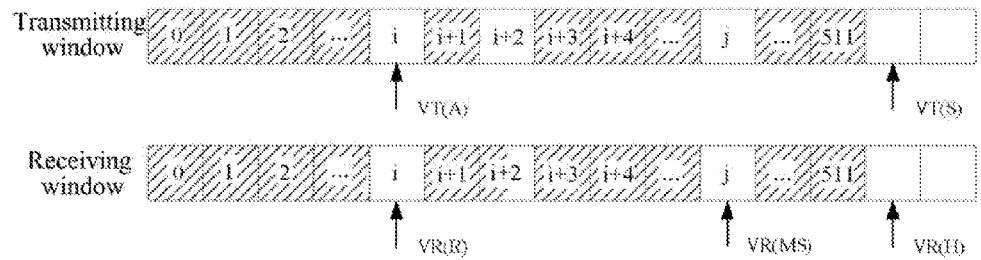
FIG. 3 is a schematic diagram of status after a window recovers to slide.

FIGS. 2 and 3 illustrate schematic diagrams of a data transmission window being in stopped status and a moving status respectively, wherein the window sizes of both the transmitting window and the receiving window are Window_Size=512, the whole window being occupied by diagonal lines represents that all PDUs have been received, only a half of the window being occupied by diagonal lines represents that only a part of the PDUs have been received and there are still one or more PDU segments that are not received.

FIG. 2 illustrates a schematic diagram of a data transmission window being in stopped status, wherein the minimum number of the PDU that is not received by the receiving window is 0, i.e., VR(R)=0, while VR(H)=512, and therefore, VR(H)−VR(R)=512=Window_Size, which indicates that the receiving window has been filled up and is in stopped status, wherein VR(R) indicates a back edge of the receiving window, and VR(H) indicates a front edge of the receiving window. When the receiving window stops, the transmitting window also necessarily has stopped, Since Window_Size=VT(S)−VT(A), at this time, VT(S)≥VR(H) and VT(A)≤VR(R), wherein VT(A) indicates a back edge of the transmitting window, and VR(R) indicates a front edge of the transmitting window. When the transmitting window stops, the VT(S) cannot move backwards so as to transmit new data. The stopped status will end only when the PDU with a number of 0 is retransmitted by the transmitting end and is acknowledged that it is received by the receiving end. Therefore, when the window is in the stopped status, the data transmission is interrupted, which seriously influences the transmission speed of the air interface data.

FIG. 3 illustrates a schematic diagram of a data transmission window being in a moving status, wherein the minimum number of the PDU that is not received by the receiving window is i>0, i.e., VR(R)=i>0, while VR(H)=512, and therefore, VR(H)−VR(R)<512=Window_Size, which indicates that the receiving window is not filled up and is in a moving status. At this time, the transmitting window is also in a moving status, and the VT(s) can move backward so as to transmit new data.

Figure 4:
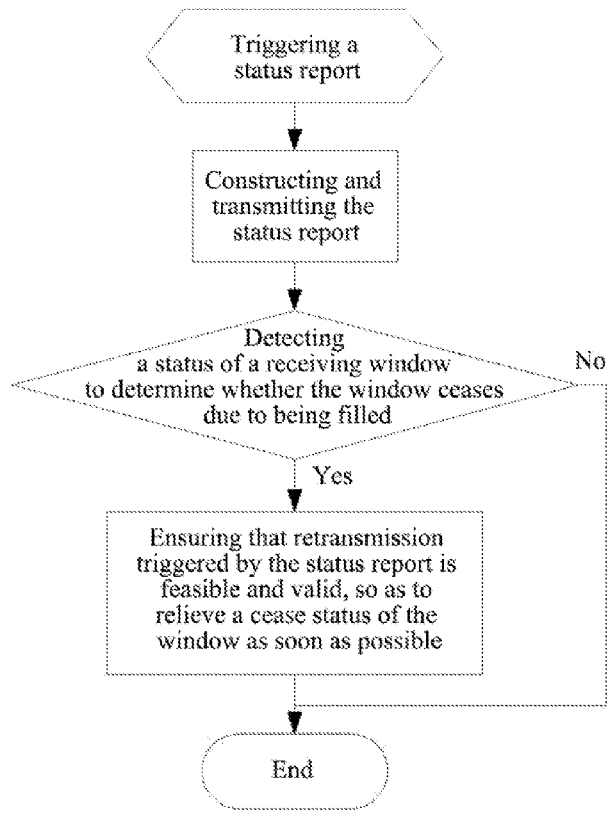
FIG. 4 is a schematic diagram of a procedure of a method for triggering a status report according to the present invention.

The procedure of a method for triggering a status report proposed herein is shown in FIG. 4, which comprises the following contents of: triggering the status report; constructing and transmitting the status report; detecting status of a receiving window to determine whether the window is about to be filled up to stop, and if the window is about to be filled up, ensuring that the retransmission triggered by the status report is feasible and effective, so as to relieve stopped status of the window as soon as possible, and then ending the current procedure; otherwise, directly ending the current procedure.

Specifically, for the contents illustrated in FIG. 4, after the t-Reordering is timeout or the receiving end receives a packet for setting a polling bit from a transmitting end so as to trigger a status report, a distance between a back edge VR(R) of the receiving window and a front edge VR(H) of the receiving window should be firstly inspected.

1. If the distance between the VR(R) and the VR(H) is within an interval of [0, Window_Size−N), t_status_prohibit timer is enabled after the status report has been transmitted, and a time length of the timer is set to T_status_prohibit−n*10*Wait_Retx_Threshold, wherein T_status_prohibit is the time length of the status prohibit timer, and n represents the times for previous repeated triggering of the status report, and n=0 during the first triggering.

2. If the distance between the VR(R) and the VR(H) is within an interval of [Window_Size−N, Window_Size], it indicates that the receiving window is about to be filled up or has been filled up, and then:

1) after the status report has been transmitted, a system frame number Init_SFN when the status report is transmitted and each subsequent system frame Cur_SFN are recorded, a change value of the system frame is calculated as that Delta_SFN=Cur_SFN-Init_SF, and when Delta_SFN=Wait_Retx_Threshold, a location of the VR(R) is inspected as follows:

a) if it is found that the location of the VR(R) does not change, it is considered that the transmission of the status report at this time is failure, and the status report is triggered again, and go to step 1), until the t-Reordering is timeout or the receiving end receives a packet for setting a polling bit from the transmitting end;

b) if it is found that the location of the VR(R) changes, it is considered that the transmission of the status report at this time is successful, the t_status_prohibit timer is enabled, and a time length of the t_status_prohibit timer is set to T_status_prohibit−n*10*Wait_Retx_Threshold. This is because the status prohibit timer is enabled immediately after the status report has been transmitted in the 36.322 protocol, while the status prohibit timer is enabled only after determining that the retransmission triggered by the status report is successful here, and therefore, the time which is consumed before should be excluded.

N can be configured to an integer larger than 0 and less than Window_Size/2; Wait_Retx_Threshold represents the number of system frames from transmitting the status report to implementing the retransmission (10 ms per frame), and n represents the times for repeatedly triggering the status report before the retransmission triggered by the status report is successful, and n=0 during the first triggering.

Figure 5:
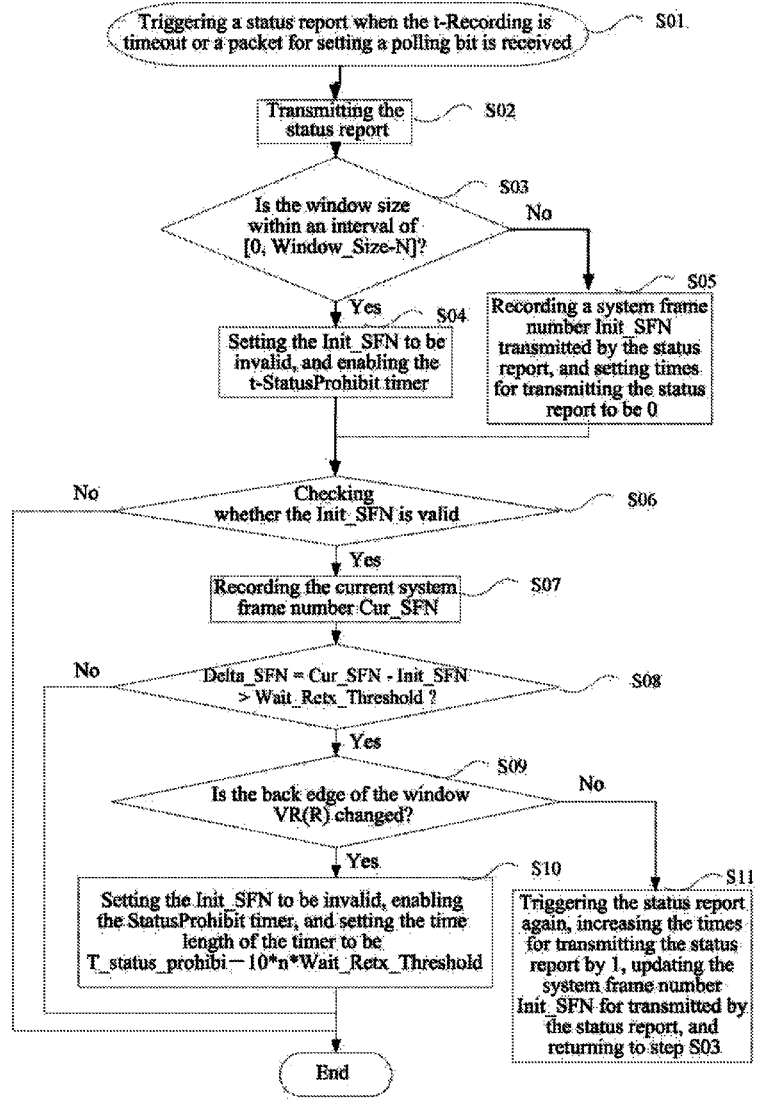
FIG. 5 is a schematic diagram of a procedure of a method for triggering a status report according to a specific embodiment of the present invention.

FIG. 5 is a schematic diagram of a procedure of a method for triggering a status report according to one specific embodiment of the present invention. As shown in FIG. 5, in the embodiment, the method for triggering a status report according to the present invention specifically comprises the following steps.

In step S01, in processing of a RLC uplink packet, the status report is triggered when the t-Reordering is timeout or the uplink receives a packet for setting a polling bit.

In step S02, the status report is constructed and transmitted.

In step S03, the window size is detected to determine whether the receiving window is in smoothly moving status, i.e., determining whether the window size is within an interval of [0, Window_Size−N].

In step S04, if the window moves smoothly, i.e., the window size is within an interval of [0, Window_Size−N], the frame number for transmitting the status report will not be recorded, the Init_SFN is set to be invalid, and the t_status_prohibit is enabled.

In step S05, if the receiving window stops or is about to stop, i.e., the window size is not within an interval of [0, Window_Size−N], the system frame number Init_SFN for transmitting the status report will be recorded, and times n for transmitting the status report is set to 0.

In step S06, the Init_SFN is checked to determine whether it is valid.

In step S07, if the Init_SFN is valid, the current system frame number cur_SFN will be recorded.

In step S08, the Delta_SFN=Cur_SFN−Init_SFN is checked to determine whether it reaches the time required to complete the retransmission triggered by the status report, and if it reaches the time, step S09 is performed.

In step S09, the retransmission triggered by the status report at the last time should arrive, the VR(R) is checked to determine whether it changes, i.e., determining whether the retransmission triggered by the status report is successful.

In step S10, the VR(R) changing indicates that the retransmission triggered by the status report has been successful, and the status prohibit timer is enabled.

In step S11, the VR(R) not changing indicates that the retransmission triggered by the status report is not successful, the status report is triggered again, the times for repeatedly triggering the status report is increased by 1, and step S03 is performed.

In the embodiment, it can assume that the size of t_status_prohibit can be set as 200 ms (the maximum value that the size of t_status_prohibit can be set is 500 ms) during establishing a service in the AM, and Wait_Retx_Threshold is 20 ms. If a status report is triggered in the condition that the window is filled up but the status report is lost in the air interface or is decoded by mistake at a data transmitting end, the present scheme can trigger the status report again. Assuming that the status report which is triggered again is transmitted to the data transmitting end successfully and an effective data retransmission is triggered, the receiving window ends a stopped status after the data transmission. At this point, corresponding steps are as follows.

S01→S02→S03→S05→S06→S07→S08→S09→S11→S03→S05→S06→S07→S08→S09→S10.

Thus, with the technical scheme of the present invention, a time interval from the status report is lost to the status report is triggered again is only 20 ms, and the time for relieving the stopped status of the window is reduced 180 (ms) compared with the scheme that does not use the scheme of the present invention.

Figure 6:
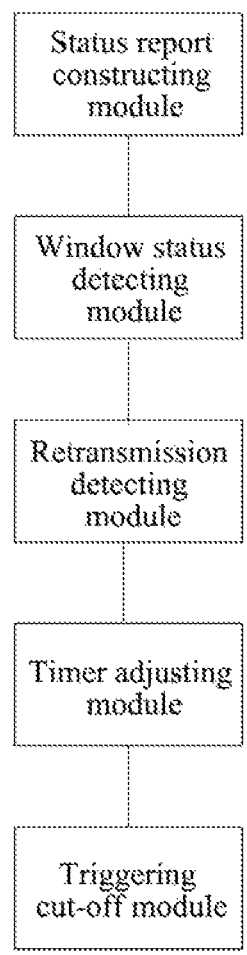
FIG. 6 is a schematic diagram of a structure of an apparatus for triggering a status report according to the present invention.

FIG. 6 is a schematic diagram of a structure of an apparatus for triggering a status report according to the present invention. As shown in FIG. 6, the apparatus for triggering a status report according to the present invention comprises: a status report constructing module, a window status monitoring module, a retransmission detecting module, a timer adjusting module and a triggering cut-off module.

The status report constructing module is configured to construct and transmit a status report when a reordering timer is timeout or a data receiving end of a RLC layer receives a packet for setting a polling bit from a transmitting end; and triggering the status report again when the retransmission detecting module detects that the retransmission triggered by the status report is unsuccessful.

The window status detecting module is configured to detect whether the data receiving window of the RLC layer is in smoothly moving status after the status report constructing module transmitting the status report, and the detecting scheme used by the window status detecting module comprises:

if a distance between a back edge and a front edge of the data receiving window is within an interval of [0, Window_Size−N), considering that the data receiving window is in smoothly moving status; otherwise, if the distance between the back edge and the front edge of the data receiving window is within an interval of [Window_Size−N, Window_Size], considering that the data receiving window is about to be filled up or have been filled up, that is, the data receiving window is not in the smoothly moving status; wherein N can be configured to be an integer larger than 0 and less than Window_Size/2, wherein Window_Size refers to a size of the data receiving window, and the size of the data receiving window in the RLC AM is 512 in the 36.322 protocol.

The retransmission detecting module is configured to detect whether the retransmission triggered by the status report which is transmitted by the status report constructing module is successful when the window status detecting module detects that the data receiving window is not in the smoothly moving status, and the detecting scheme used by the retransmission detecting module comprises:

recording a system frame number at the time when transmitting the status report transmitted by the status report constructing module; and judging whether a location of the back edge of the data receiving window changes when a difference between a system frame number of the current time and the recorded system frame number at the time when transmitting the status report is equal to the number of required system frames from transmitting the status report to completing the retransmission, and if changes, considering that the retransmission triggered by the status report is successful; otherwise, considering the retransmission triggered by the status report is unsuccessful.

The uses of the timer adjusting module include: enabling a status prohibit timer when the window status detecting module detects that the data receiving window is in the smoothly moving status, and setting a time length of the status prohibit timer to T_status_prohibit−n*10*Wait_Retx_Threshold, wherein T_status_prohibit is the time length of the status prohibit timer in the 36.322 protocol, and n represents times for repeatedly triggering the status report before the retransmission triggered by the status report is successful, and n=0 during the first triggering; and enabling the status prohibit timer when the retransmission detecting module detects that the retransmission triggered by the status report at this time is successful, and setting the time length of the status prohibit timer to T_status_prohibit−n*10*Wait_Retx_Threshold, wherein T_status_prohibit is the time length of the status prohibit timer in the 36.322 protocol, and n represents times for repeatedly triggering the status report before the retransmission triggered by the status report is successful, and n=0 during the first triggering.

The triggering cut-off module is configured to transmit orders to other modules including the status report constructing module, the window status detecting module, the retransmission detecting module and the timer adjusting module in the apparatus to end the processing of the current status report and switch to processing of a next status report when the reordering timer is timeout or the receiving end receives a next packet for setting a polling bit from the transmitting end.

The specific embodiments described above further describe the objects, technical schemes and beneficial effects of the present invention in detail. It should be noted that the above description is only the specific embodiments of the present invention. For those skilled in the art, various changes and variations can be made to the invention without departing from the spirit and scope of the present invention. Thus, if these modifications and variations of the present invention fall into the scope of the technical schemes recited in the claims of the present invention and equivalent techniques thereof, the present invention is also intended to include these changes and variations.

What is claimed is:

1. A method for triggering a status report, comprising:
   in step A, constructing and transmitting a status report at a data receiving end of a Radio Link Control (RLC) layer when a reordering timer is timeout or a packet for setting a polling bit is received from a transmitting end, and then performing step B;
   in step B, determining whether a data receiving window is in smoothly moving status, and if in the smoothly moving status, enabling a status prohibit timer immediately after the status report has been transmitted; and if the data receiving window is not in the smoothly moving status, performing step C;
   in step C, detecting whether retransmission triggered by the status report at this time is successful, and if successful, enabling the status prohibit timer; and if not successful, performing step D; and
   in step D, triggering the status report again, and returning to step B;
   wherein in step C, detecting whether the retransmission triggered by the status report at this time is successful specifically comprises:
   step C1, recording a system frame number at time when transmitting the status report at this time; and
   step C2, when a difference between a system frame number at a current time and the recorded system frame number at the time when transmitting the status report is equal to a number of required system frames from transmitting the status report to completing the retransmission, judging whether a location of the back edge of the data receiving window changes, and if changes, determining that the retransmission triggered by the status report at this time is successful; and if does not change, determining that the retransmission triggered by the status report at this time is unsuccessful.

2. The method according to claim 1, wherein in step B, determining whether the data receiving window is in the smoothly moving status specifically comprises:
   if a distance between a back edge and a front edge of the data receiving window is within an interval of [0, Window_Size−N), determining that the data receiving window is in the smoothly moving status; and if the distance between the back edge and the front edge of the data receiving window is within an interval of [Window_Size−N, Window_Size], determining that the data receiving window is not in the smoothly moving status;
   wherein N is an integer which is larger than 0 and less than Window_Size/2; and Window_Size refers to a size of the data receiving window.

3. The method according to claim 2, wherein in step B, when enabling the status prohibit timer, the method further comprises: setting a time length of the status prohibit timer to T_status_prohibit−n*10*Wait_Retx_Threshold, wherein T_status_prohibit is the time length of the status prohibit timer; and n represents times for previously repeated triggering of the status report, and n=0 during a first triggering.

4. The method according to claim 2, wherein in step C, if detecting that the transmission triggered by the status report at this time is successful, and when enabling the status prohibit timer, the method further comprises: setting a time length of the status prohibit timer to T_status_prohibit−n*10*Wait_Retx_Threshold;
   wherein T_status_prohibit is the time length of the status prohibit timer, and n represents times for repeatedly triggering the status report before the retransmission triggered by the status report is successful, and n=0 during a first triggering.

5. The method according to claim 2, further comprising: ending a current procedure for triggering the status report and switching to processing of a next status report when the reordering timer is timeout or the receiving end receives a next packet for setting a polling bit from the transmitting end.

6. The method according to claim 1, wherein in step B, when enabling the status prohibit timer, the method further comprises: setting a time length of the status prohibit timer to T_status_prohibit−n*10*Wait_Retx_Threshold, wherein T_status_prohibit is the time length of the status prohibit timer; and n represents times for previously repeated triggering of the status report, and n=0 during a first triggering.

7. The method according to claim 1, wherein in step C, if detecting that the transmission triggered by the status report at this time is successful, and when enabling the status prohibit timer, the method further comprises: setting a time length of the status prohibit timer to T_status_prohibit−n*10*Wait_Retx_Threshold;
   wherein T_status_prohibit is the time length of the status prohibit timer, and n represents times for repeatedly triggering the status report before the retransmission triggered by the status report is successful, and n=0 during a first triggering.

8. The method according to claim 1, further comprising: ending a current procedure for triggering the status report and switching to processing of a next status report when the reordering timer is timeout or the receiving end receives a next packet for setting a polling bit from the transmitting end.

* * * * *